US012177344B2

(12) United States Patent
Jumelle

(10) Patent No.: US 12,177,344 B2
(45) Date of Patent: Dec. 24, 2024

(54) ENCRYPTION METHOD AND SYSTEM FOR XENOMORPHIC CRYPTOGRAPHY

(71) Applicants: AUTONYM PTE. LTD., Singapore (SG); Yat Wan Lui, Sai Wan Ho (HK)

(72) Inventor: Frederic Andre Jumelle, Sai Wan Ho (HK)

(73) Assignees: Autonym Pte. Ltd. (SG); Yat Wan Lue (HK)

( * ) Notice: Subject to any disclaimer, the term of this patent is extended or adjusted under 35 U.S.C. 154(b) by 252 days.

(21) Appl. No.: 17/791,870

(22) PCT Filed: Nov. 9, 2020

(86) PCT No.: PCT/CN2020/127474
§ 371 (c)(1),
(2) Date: Jul. 8, 2022

(87) PCT Pub. No.: WO2022/095018
PCT Pub. Date: May 12, 2022

(65) Prior Publication Data
US 2023/0050628 A1    Feb. 16, 2023

(51) Int. Cl.
*H04L 9/30* (2006.01)
*H04L 9/08* (2006.01)
(52) U.S. Cl.
CPC ............... *H04L 9/088* (2013.01); *H04L 9/30* (2013.01)
(58) Field of Classification Search
CPC ......... H04L 9/088; H04L 9/30; H04L 9/3066; H04L 9/3228; H04L 2209/34;
(Continued)

(56) References Cited

U.S. PATENT DOCUMENTS 9,672,760 B1 * 6/2017 Breuer ................... H04L 9/3247
11,334,768 B1 * 5/2022 Brody ................. G06F 16/5866
(Continued)

OTHER PUBLICATIONS

Dong, Zhenxing, International Search Report and Written Opinion, PCT/CN2020/127474, National Intellectual Property Administration, Aug. 5, 2021.

*Primary Examiner* — Farid Homayounmehr
*Assistant Examiner* — Mudasiru K Olaegbe
(74) *Attorney, Agent, or Firm* — Gavrilovich, Dodd & Lindsey LLP

(57) ABSTRACT

The present invention relates to a method and system of cybersecurity; and particularly relates to an encryption method and system on the basis of cognitive computing for xenomorphic cryptography or unusual form of cryptography; said method comprises generating a Functional Neural Network or KeyNode (KN) of the system by programming a chain of multiple nodes also called Artificial Mirror Neurons (AMN) based on captured information of reaction time and emotional response to a simple task; racing the nodes in the Functional Neural Network or KeyNode (KN) as an encryption device or cipher for the time of use; generating a password at the time of use based on the sum of intrinsic values of the nodes in the racing network at this time and adopting the generated password for authentication. The present invention can be applied to secure online and mobile communication especially at the dawn of 5G with generalization of open API lifestyle platforms so as to allow real-time identification for digital cryptocurrency payments and other public distributed ledger technology (DLT) mechanisms.

10 Claims, 10 Drawing Sheets

(58) Field of Classification Search
CPC ..... H04L 9/0863; H04L 9/3231; H04L 9/302; G06N 7/01; G06N 3/105; G06N 3/04; G06N 3/08
See application file for complete search history.

(56) References Cited

U.S. PATENT DOCUMENTS

| | | |
|---|---|---|
| 2008/0155269 A1 | 6/2008 | Yoshikawa |
| 2010/0172504 A1* | 7/2010 | Allen .................... H04L 9/0825 380/278 |
| 2018/0091304 A1* | 3/2018 | Brook ................... H04L 9/3066 |
| 2019/0113973 A1* | 4/2019 | Coleman ................. G06F 3/011 |
| 2019/0260736 A1* | 8/2019 | Grunin ............... H04L 63/0838 |
| 2019/0319803 A1 | 10/2019 | Misoczki et al. |
| 2020/0374113 A1* | 11/2020 | Noam ................... H04L 9/0637 |
| 2021/0267474 A1* | 9/2021 | Wang .................... A61B 5/117 |

\* cited by examiner

| T1 | Σ Θ1 | | | | | | Σ Θ2 | T2 |
|---|---|---|---|---|---|---|---|---|
| N1 | Θ1 | Θ2 | Θ3 | Θ4 | Θ5 | Θ6 | Θ7 | N1 |
| N2 | Θ1 | Θ2 | Θ3 | Θ4 | Θ5 | Θ6 | Θ7 | N2 |
| N3 | Θ1 | Θ2 | Θ3 | Θ4 | Θ5 | Θ6 | Θ7 | N3 |
| N4 | Θ1 | Θ2 | Θ3 | Θ4 | Θ5 | Θ6 | Θ7 | N4 |
| N5 | Θ1 | Θ2 | Θ3 | Θ4 | Θ5 | Θ6 | Θ7 | N5 |
| N6 | Θ1 | Θ2 | Θ3 | Θ4 | Θ5 | Θ6 | Θ7 | N6 |
| N7 | Θ1 | Θ2 | Θ3 | Θ4 | Θ5 | Θ6 | Θ7 | N7 |
| N8 | Θ1 | Θ2 | Θ3 | Θ4 | Θ5 | Θ6 | Θ7 | N8+1 |

| KN 1 | 1 | 2 | 3 | 4 | 5 | 6 | 7 | 8 | | | | | | | | | | | | |
|---|---|---|---|---|---|---|---|---|---|---|---|---|---|---|---|---|---|---|---|---|
| KN 2 | 1 | 2 | 3 | 4 | 5 | 6 | 7 | 8 | 9 | | | | | | | | | | | |
| KN 3 | 1 | 2 | 3 | 4 | 5 | 6 | 7 | 8 | 9 | 10 | | | | | | | | | | |
| KN 4 | 1 | 2 | 3 | 4 | 5 | 6 | 7 | 8 | 9 | 10 | 11 | | | | | | | | | |
| KN 5 | 1 | 2 | 3 | 4 | 5 | 6 | 7 | 8 | 9 | 10 | 11 | 12 | | | | | | | | |
| KN 6 | 1 | 2 | 3 | 4 | 5 | 6 | 7 | 8 | 9 | 10 | 11 | 12 | 13 | | | | | | | |
| KN 7 | 1 | 2 | 3 | 4 | 5 | 6 | 7 | 8 | 9 | 10 | 11 | 12 | 13 | 14 | | | | | | |
| KN 8 | 1 | 2 | 3 | 4 | 5 | 6 | 7 | 8 | 9 | 10 | 11 | 12 | 13 | 14 | 15 | | | | | |
| KN 9 | 1 | 2 | 3 | 4 | 5 | 6 | 7 | 8 | 9 | 10 | 11 | 12 | 13 | 14 | 15 | 16 | | | | |
| KN 10 | 1 | 2 | 3 | 4 | 5 | 6 | 7 | 8 | 9 | 10 | 11 | 12 | 13 | 14 | 15 | 16 | 17 | | | |
| KN 11 | 1 | 2 | 3 | 4 | 5 | 6 | 7 | 8 | 9 | 10 | 11 | 12 | 13 | 14 | 15 | 16 | 17 | 18 | | |
| KN 12 | 1 | 2 | 3 | 4 | 5 | 6 | 7 | 8 | 9 | 10 | 11 | 12 | 13 | 14 | 15 | 16 | 17 | 18 | 19 | |
| KN 13 | 1 | 2 | 3 | 4 | 5 | 6 | 7 | 8 | 9 | 10 | 11 | 12 | 13 | 14 | 15 | 16 | 17 | 18 | 19 | 20 |

Figure 3

| KN 16 | KN 17 | KN 18 | KN 19 | KN 20 | KN 21 |
|---|---|---|---|---|---|
| X | | | | | |
| ② | X | | | | |
| ③ | ③ | X | | | |
| ④ | ④ | ④ | X | | |
| ⑤ | ⑤ | ⑤ | ⑤ | X | |
| ⑥ | ⑥ | ⑥ | ⑥ | ⑥ | X |
| ⑦ | ⑦ | ⑦ | ⑦ | ⑦ | ⑦ |
| ⑧ | ⑧ | ⑧ | ⑧ | ⑧ | ⑧ |
| ⑨ | ⑨ | ⑨ | ⑨ | ⑨ | ⑨ |
| ⑩ | ⑩ | ⑩ | ⑩ | ⑩ | ⑩ |
| ⑪ | ⑪ | ⑪ | ⑪ | ⑪ | ⑪ |
| ⑫ | ⑫ | ⑫ | ⑫ | ⑫ | ⑫ |
| ⑬ | ⑬ | ⑬ | ⑬ | ⑬ | ⑬ |
| ⑭ | ⑭ | ⑭ | ⑭ | ⑭ | ⑭ |
| ⑮ | ⑮ | ⑮ | ⑮ | ⑮ | ⑮ |

Figure 4(a)

| KN 16 | KN 17 | KN 18 | KN 19 | KN 20 | KN 21 |
|---|---|---|---|---|---|
| X | | | | | |
| ② | ② | ② | ② | ② | X |
| ③ | X | | | | |
| ④ | ④ | ④ | ④ | ④ | ④ |
| ⑤ | ⑤ | ⑤ | ⑤ | ⑤ | ⑤ |
| ⑥ | ⑥ | X | | | |
| ⑦ | ⑦ | ⑦ | ⑦ | ⑦ | ⑦ |
| ⑧ | ⑧ | ⑧ | ⑧ | ⑧ | ⑧ |
| ⑨ | ⑨ | ⑨ | ⑨ | ⑨ | ⑨ |
| ⑩ | ⑩ | ⑩ | ⑩ | ⑩ | ⑩ |
| ⑪ | ⑪ | ⑪ | ⑪ | ⑪ | ⑪ |
| ⑫ | ⑫ | ⑫ | ⑫ | ⑫ | ⑫ |
| ⑬ | ⑬ | ⑬ | X | | |
| ⑭ | ⑭ | ⑭ | ⑭ | ⑭ | ⑭ |
| ⑮ | ⑮ | ⑮ | ⑮ | ⑮ | ⑮ |
| ⑯ | ⑯ | ⑯ | ⑯ | ⑯ | ⑯ |
| ⑰ | ⑰ | ⑰ | ⑰ | X | |
| ⑱ | ⑱ | ⑱ | ⑱ | ⑱ | ⑱ |

Figure 4(b)

| KN 16 | KN 17 | KN 18 | KN 19 | KN 20 | KN 21 |
|---|---|---|---|---|---|
| X |  |  |  |  |  |
| ❷ | ❷ | ❷ | X |  |  |
| ❸ | X |  |  |  |  |
| ❹ | ❹ | ❹ | ❹ | X |  |
| ❺ | ❺ | ❺ | ❺ | ❺ | ❺ |
| ❻ | ❻ | X |  |  |  |
| ❼ | ❼ | ❼ | ❼ | ❼ | X |
| ❽ | ❽ | ❽ | ❽ | ❽ | ❽ |
| ❾ | ❾ | ❾ | ❾ | ❾ | ❾ |

Figure 4(c)

| KN 16 | KN 17 | KN 18 | KN 19 | KN 20 | KN 21 |
|---|---|---|---|---|---|
| X |  |  |  |  |  |
| ❷ | ❷ |  |  |  |  |
| ❸ | ❸ | ❸ |  |  |  |
| ❹ | ❹ | ❹ | ❹ |  |  |
| ❺ | ❺ | ❺ | ❺ | ❺ |  |
| ❻ | ❻ | ❻ | ❻ | ❻ | X |
| ❼ | ❼ | X |  |  |  |
| ❽ | ❽ | ❽ | ❽ | ❽ | ❽ |
| ❾ | ❾ | ❾ | ❾ | ❾ | ❾ |
| ❿ | ❿ | ❿ | ❿ | ❿ | ❿ |
| ⓫ | ⓫ | ⓫ | ⓫ | ⓫ | ⓫ |
| ⓬ | ⓬ | X |  |  |  |
| ⓭ | ⓭ | ⓭ | ⓭ | ⓭ | ⓭ |
| ⓮ | ⓮ | ⓮ | X |  |  |
| ⓯ | ⓯ | ⓯ | ⓯ | ⓯ | ⓯ |

Figure 4(d)

ENCRYPTION METHOD AND SYSTEM FOR XENOMORPHIC CRYPTOGRAPHY

CROSS REFERENCE TO RELATED APPLICATIONS

This application is a US. National Phase application filed under 35 U.S.C. § 371 and claim priority to International Application No. PCT/CN2020/127474, filed Nov. 9, 2020, the disclosure of which is incorporated herein by reference.

The present invention relates to a method and system of cybersecurity; and particularly relates to an encryption method and system on the basis of cognitive computing for xenomorphic cryptography or unusual form of cryptography.

BACKGROUND TECHNOLOGY

The increased digitization of the cyber world combined with the greed and ingenuity of attackers has raised cyber-crime to an unprecedented level that demands a strong security system and method which is beyond the hard-to-solve problems in number theory.

Cryptography is a method of protecting information and communications through the use of codes, so that only those for whom the information is intended can read and process it. And cryptography in cybersecurity is the study of secure communications techniques that allow only the sender and the intended receiver of a message to view its contents. Nowadays, cryptography is one of the most crucial aspects for cybersecurity and an indispensable tool in the information age especially at the dawn of 5G.

Classic cryptography makes use of private and public key whether symmetric or asymmetric and a hash function for record, storage and retrieval. While this category of cryptography algorithms is mostly based on hard-to-solve problems in number theory, which is vulnerable to quantum computers attacks. Quantum algorithms, such as Shor's algorithm (IEEE 1994) poses an essential threat to the security of cryptosystems based on number theory difficulties such as RSA cryptosystem. Shi Jinjing and Chen Shuhui et al. (*Nature*, 2020) have proposed a continuous-variable quantum neural network (QNN) for designing a quantum cryptography algorithm that can set cryptography free from attacks on numbers. QNN was firstly proposed by Kak (1995) and it provided a potential solution to design a novel encryption and decryption mechanism. Progress has been made with quantum neural cryptography (QNC) and experiments on Strawberry fields are promising but this is far from being deployable.

With the development of QNN, there are new methods or devices coming in this area, such as in CN111563186 A, Baidu adopted QNN to develop a quantum data storage method and reading method and device and a computing device, related to the field of quantum computers, the storage method includes: making the first quantum neural network to act on the initial state to obtain the output quantum state; computing the loss function based on the target quantum state and the quantum state output by the first quantum neural network, where the dimension of the first quantum neural network relates to the dimensions of the target quantum, and the loss function corresponds to the distance between the target quantum state and the quantum states output by the first quantum neural network; adjusting the parameters of the first quantum neural network according to said loss function so as to conduct iteratively training to the first quantum neural network until it reaches the preset iteration stop condition; saving the parameters of the first quantum neural network after training into the hardware device.

In CN111582210 A, Shenyang University of Technology developed a human behavior recognition method based on quantum neural network, comprising the following steps: collecting human body motion images and gray scaling each frame; storing the human body motion image in the quantum state to form the NEQR volume sub-image; detecting quantum image foreground: for NEQR quantum images, adopting the background difference method and the ViBe algorithm to respectively detect stable objects and moving objects; using Hadamard door edge detection algorithm to extract the edge information of the human body action from the "motion target" in the third step, and forming the edge quantum images; based on quantum black box convolution method, performing convolution operation on the "edge quantum image" in the fourth step, to extract the feature points of the action; and making a recognition sample set; reading the trained weights and constructing a quantum BP neural network to identify samples.

Password generators are simple daily life tools that encrypt our identity or factorize our authentication but have become burdensome. Password use-cases including account creation and further logins have become the main targets of cyber-attackers. The increased digitization combined with the greed and ingenuity of attackers has raised cybercrime to an unprecedented level that demands a strong technological response.

In CN103840936A, Shandong Institute of Quantum Science and Technology developed an encryption transmission method for quantum cryptographic networks, which uses classic encryption and quantum one-time encryption for business data to perform shunt transmission, the continuation of business data encryption transmission is increased and also the reliability of business data transmission can be improved; at the same time, it reduces the consumption of quantum key data, and reduces the quantum key generation load of the quantum cryptographic network, and reduces the cost of encrypted transmission of quantum cryptographic network business data.

Quantum cryptography is the science of exploiting quantum mechanical properties to perform cryptographic tasks. The best known example of quantum cryptography is quantum key distribution which offers an information-theoretically secure solution to the key exchange problem. The advantage of quantum cryptography lies in the fact that it allows the completion of various cryptographic tasks that are proven or conjectured to be impossible using only classical (i.e. non-quantum) communication. For example, it is impossible to copy data encoded in a quantum state. If one attempts to read the encoded data, the quantum state will be changed (no-cloning theorem). This could be used to detect eavesdropping in quantum key distribution. The best-known and developed application of quantum cryptography is quantum key distribution (QKD), which is the process of using quantum communication to establish a shared key between two parties (Alice and Bob, for example) without a third party (Eve) learning anything about that key, even if Eve can eavesdrop on all communication between Alice and Bob. If Eve tries to learn information about the key being established, discrepancies will arise causing Alice and Bob to notice. Once the key is established, it is then typically used for encrypted communication using classical techniques.

While QKD is seemingly secure, its applications face the challenge of practicality. This is due to transmission distance and key generation rate limitations. Ongoing studies and growing technology have allowed further advancements in such limitations.

Artificial Intelligence modeling has been integrating research results from different fields of physics, neurobiology, biochemistry, and neuroscience to promote the adoption of inspired mechanisms that can contribute to user protection and cybersecurity in general.

BRIEF SUMMARY

The present invention relates to an encryption method and system on the basis of cognitive computing for xenomorphic cryptography or unusual form of cryptography. This form uses cognitive computing that combines incoming signal processing with neuromorphic artificial neural network for contextual password generation, encryption, and evolution by elongation and retraction over time. With the encryption method and system based on cognitive computing, the user cognitive variability itself becomes the password or decryption key's originator so the generated passwords/keys can take unpredictable forms also called Xenomorphic in this invention.

The present invention provides an encryption method comprising: Generating a Functional Neural Network or KeyNode (KN) of the system by programming a chain of multiple nodes also called Artificial Mirror Neurons (AMN) based on captured information of reaction time and emotional response to a simple task; racing the nodes in the Functional Neural Network or KeyNode (KN) as an encryption device or cipher for the time of use; generating a password at the time of use based on the sum of intrinsic values of the nodes in the racing network at this time and adopting the generated password for authentication; Classifying chains of multiple nodes through an identification by chained autonyms (ICA) mechanism where each autonym comprises multiple nodes held in a chain which can be generated, elongated, and can also evolve by retraction of nodes or decay after a certain number of nodes has been generated; Encoding KeyNodes based on infinite proposition captured by interactive cognitive computing, forming an irregular tetragon matrix, and allowing dynamic encoding of unusual forms of cryptography; Generating the boundary of the KeyNode, where the minimum size is defined as A, the maximum size is defined as B, and the time of maximum size of the KeyNode is defined as C=B−(A−1); Generating a one-time decryption key based on said encoded KeyNode that can generate a one-time encryption key and form a one-time pair of decryption and encryption keys (private and public keys) for encrypted communication; Transmitting the one-time encryption key (public key) over any unsecured channel to selected senders for encrypting the plaintext to become a ciphertext; Decrypting the ciphertext of the senders at the receiver's end using the one-time decryption key (private key) to generate the plaintext data.

In one aspect of the present invention, wherein the step of Programming Artificial Mirror Neuron or Node, further comprising capturing the reaction time as a reaction to the cognitive task between input and output, which determines the motor core radius size; capturing the emotional response in emotional type as a reaction to the said cognitive task, which determines the sensory core radius size; and determining the velocity which is inversely to the age information; and deriving the angular velocity ω from said velocity and the angle θ of both said motor core and sensory core; the step of racing the chain of nodes in the Functional Neural Network or KeyNode (KN), further comprising programming multiple nodes, and the chain of nodes in the Functional Neural Network or KeyNode (KN) serves as an encryption device or a cipher; said KeyNodes comprise one first signup KeyNode or KN1 which contains at least 8 nodes; the step of generating a password, further comprising generating said password for use at time 2 (T2), on the base of each node angle θ changes constantly between time 1 (T1) and time 2 (T2), and the sum of angle θ of all nodes also called sum of angle θ2 at time 2 depends on the position of the radiuses or the value of the velocities of the nodes at time 2; and the method further comprising defining each node by said motor core radius, said sensory core radius, two angle θ1 and angle θ2, two velocity v1 and velocity v2, and two angular velocity ω1 and angular velocity ω2 at the time $T_1$ and T2, and the time of each node creation in minute and each new node has a specific time of creation T1+n that will refer to the initial nodes time of creation when made at signup or T1; and when reaching the time T2 or time of applying said password, creating a new node by generation-elongation, and summing up said motor core radius and said sensory core radius or angular velocities for all racing nodes in the KN arriving at T2, and adopting said password for authentication.

In another aspect of the present invention, wherein further comprising, Transmitting said password through a Json Web Token (JWT) to the receiver for authentication.

In another aspect of the present invention, wherein, the ICA can also be used for tracking authentication and decision patterns also called cognitive biometrics.

In another aspect of the present invention, wherein, each node could decay or be retracted according to the following mechanisms: linear decay or simple retraction, random decay or disorganized retraction, preset decay or organized retraction, or binomial distributed decay or probabilistic retraction.

In another aspect of the present invention, wherein, during said linear decay or simple retraction, the firstly generated node will be removed the earliest in a linear sequence from the first one to the last one.

In another aspect of the present invention, wherein, during said random decay or disorganized retraction, selecting one node from the list of existing nodes with uniform probability $$\frac{1}{N}$$

each time and removing it thereafter, N refers to the existing number of nodes.

In another aspect of the present invention, wherein during said preset decay or organized retraction, removing one node in a preset fixed order irrespective of the generation time of each node.

In another aspect of the present invention, wherein during said binomial distributed decay or probabilistic retraction, removing each existing node according to a pre-set probability, where the whole removal process follows a binomial distribution according to the following:

Setting the removal probability to be $$\frac{1}{N},$$

and removing each node independently with said probability:

$$\text{Probability } (k \text{ nodes to be removed}) = \binom{N}{k}\left(\frac{1}{N}\right)^k\left(1-\frac{1}{N}\right)^{N-k}$$

K refers to the nodes to be removed.

In another aspect of the present invention, using the angle θ for password:

Password at time $T =$ $$\frac{1}{N_T}\sum_{i=0}^{N_T}(v_{mi}T) \% (2\pi r_{1i}) + \frac{1}{N_T}\sum_{i=0}^{N_T}(v_{Si}T) \% (2\pi r_{2i})$$

or using the angular velocities ω for password is:

$$\text{Password at time } T = \frac{1}{N_T}\sum_{i=0}^{N_T}\frac{v_{mi}}{2\pi r_{1i}} + \frac{1}{N_T}\sum_{i=0}^{N_T}\frac{v_{si}}{2\pi r_{2i}}$$

where vmi is the velocities of the motor core of the i-th node in the FNN, rli is the radius of the motor core of the i-th node in the FNN, $v_{si}$ is the velocities of the sensory core of the i-th node in the FNN, $r_{2i}$ is the radius of the sensory core of the i-th node in the FNN and $N_T$ is the number of nodes in FNN at time T.

In another aspect of the present invention, wherein said authentication is offline authentication in-tandem with biometric facial recognition.

In another aspect of the present invention, wherein said authentication refers to online authentication when JWT carries said password (of KeyNode1+n) to the receiver at the time of use.

In another aspect of the present invention, wherein for the motor cores, the following steps are provided:

individual angle theta from $M$ of each node at time $T = (v_m T) \% (2\pi r_1)$ sum of angles theta from $M$ of the whole FNN at the time $T =$ $$\frac{1}{N_T}\sum_{i=0}^{N_T}(v_{mi}T) \% (2\pi r_{1i})$$

where $v_m$ is the velocity of the motor core in an AMN, vmi is the velocities of the motor core of the i-th node in the FNN, r1 is the radius of the motor core in an AMN, rli is the radius of the motor core of the i-th node in the FNN, and $N_T$ is the number of nodes in FNN at time T.

In another aspect of the present invention, wherein for the sensory cores, the following steps are provided:

individual angle theta from $S$ of each node at time $T = (v_s T) \% (2\pi r_2)$ sum of angles theta from $S$ of the whole FNN at time $T =$ $$\frac{1}{N_T}\sum_{i=0}^{N_T}(v_{si}T) \% (2\pi r_{2i})$$

where vs is the velocity of the sensory core in an AMN, $v_{si}$ is the velocities of the sensory core of the i-th node in the FNN, r2 is the radius of the sensory core in an AMN, r2i is the radius of the sensory core of the i-th node in the FNN, and $N_T$ is the number of nodes in FNN at time T.

In another aspect of the present invention, wherein for the Angular Velocity per core, the following steps are provided:

individual angular velocity from $M$ of each node at time $T = \frac{v_m}{2\pi r_1}$ sum of angular velocities from $M$ of the whole FNN at time $T =$ $$\frac{1}{N_T}\sum_{i=0}^{N_T}\frac{v_{mi}}{2\pi r_{1i}}$$

where $v_m$ i the velocity of the motor core in an AMN, vmi is the velocities of the motor core of the i-th node in the FNN, r1 is the radius of the motor core in an AMN, rli is the radius of the motor core of the i-th node in the FNN, and $N_T$ is the number of nodes in FNN at time T;

Similarly, for the sensory cores, the following steps are provided:

individual angular velocity from $S$ of each node at time $T = \frac{v_s}{2\pi_2}$ sum of angular velocities from $S$ of the whole FNN at time $T =$ $$\frac{1}{N_T}\sum_{i=0}^{N_T}\frac{v_{si}}{2\pi r_{2i}}$$

where vs is the velocity of the sensory core in an AMN, $v_{si}$ is the velocities of the sensory core of the i-th node in the FNN, r2 is the radius of the sensory core in an AMN, $r_{2i}$ is the radius of the sensory core of the i-th node in the FNN, and $N_T$ is the number of nodes in FNN at time T.

In another aspect of the present invention, wherein in the step of encoding KeyNodes based on infinite proposition captured by interactive cognitive computing, there are four encoding categories such as Question answer-types (Qa), Binary visual-choices (Bv), binary Iconic-choices (Ic) and Ternary visual-choices (Tv) to form the irregular tetragon matrix; generating a new node in the KeyNode according to the output from one of these four types, producing a cipher combining both the reactional nature and the timeliness of KeyNode and refreshing the FNN with a new node.

In another aspect of the present invention, wherein if at time $T_1$ there are $N_{T_1}$ nodes and starting a new node, this $N_{T_1}+1$ node will not be accounted for the password at time $T_1$ but for future passwords only, for example time T2;

said angles theta at time $T_1$:

sum of theta angles from $M$ of the whole FNN at time $T_1 =$ $$\frac{1}{N_{T_1}}\sum_{i=0}^{N_{T_1}}(v_{mi}T_1) \% (2\pi r_{1i})$$

and theta angles at time $T_2$:

sum of theta angles from $S$ of the whole FNN at time $T_2 =$ $$\frac{1}{N_{T_2}}\sum_{i=0}^{N_{T_2}}(v_{mi}T_2) \% (2\pi r_{1i})$$

where $N_{T_2}=N_{T_1}+1$.

And the angular velocities at time $T_1$:

sum of angular velocities from $M$ of the whole $FNN$ at time $T_1 =$ $$\frac{1}{N_{T_1}} \sum_{k=0}^{N_{T_1}} \frac{v_{mi}}{2\pi_{1i}}$$

and angular velocities at time $T_2$:

sum of angular velocities from $S$ of the whole $FNN$ at time $T_2 =$ $$\frac{1}{N_{T_2}} \sum_{k=0}^{N_{T_2}} \frac{v_{mi}}{2\pi r_{2i}}$$

where $N_{T_2} = N_{T_1} + 1$.

Cognitive computing combines the incoming signal processing with a neuromorphic artificial neural network for contextual password generation Aiming to reinvent password, the present system puts analysis of user's cognitive prowess at the core of the password's generation and its use. This is achieved through self-programing artificial mirror nodes (AMN) in small chains or time-sensitive keys that will generate a unique sum of (nodes) states based on fuzzy logic in the form of angular IO or angular velocity Eu at the time T of use and encapsulate the result or password in a one-time token for identification or authentication.

The present system can also produce decryption keys of unpredictable forms also called Xenomorphic in this invention.

BRIEF DESCRIPTION OF SEVERAL VIEWS OF THE DRAWINGS

The drawings referenced herein form a part of the specification. Features shown in the drawings are meant as illustrative of only some embodiments of the invention, and not of all embodiments of the invention unless otherwise explicitly indicated.

FIG. 1(a) and FIG. 1(b) are the mechanisms of the first chains of nodes (signup KeyNode, a KN of 8 nodes numbered N1 to N8) of the present invention.

FIG. 2(a) indicates one example of the formation of chains of nodes (KeyNodes) of the present invention, with a linear decay mechanism starting with KN16.

FIG. 2(b) indicates another example of the formation of chains of nodes (KeyNodes) of the present invention, with a random decay mechanism starting with KN16.

FIG. 3 indicates one example of the encoding of chains of nodes (KeyNodes) in XenoBase of the present invention.

FIG. 4(a) indicates linear decay or simple retraction, i.e. type 1, in one example of the present invention.

FIG. 4(b) indicates random decay or disorganized retraction, i.e. type 2, in one example of the present invention.

FIG. 4(c) indicates preset decay or organized retraction, i.e. type 3, in one example of the present invention.

FIG. 4(d) indicates the binomial distributed decay or probabilistic retraction with expectation of 1 node removed per time, i.e. type 4, in one example of the present invention.

DETAILED DESCRIPTION

Figure 1A:
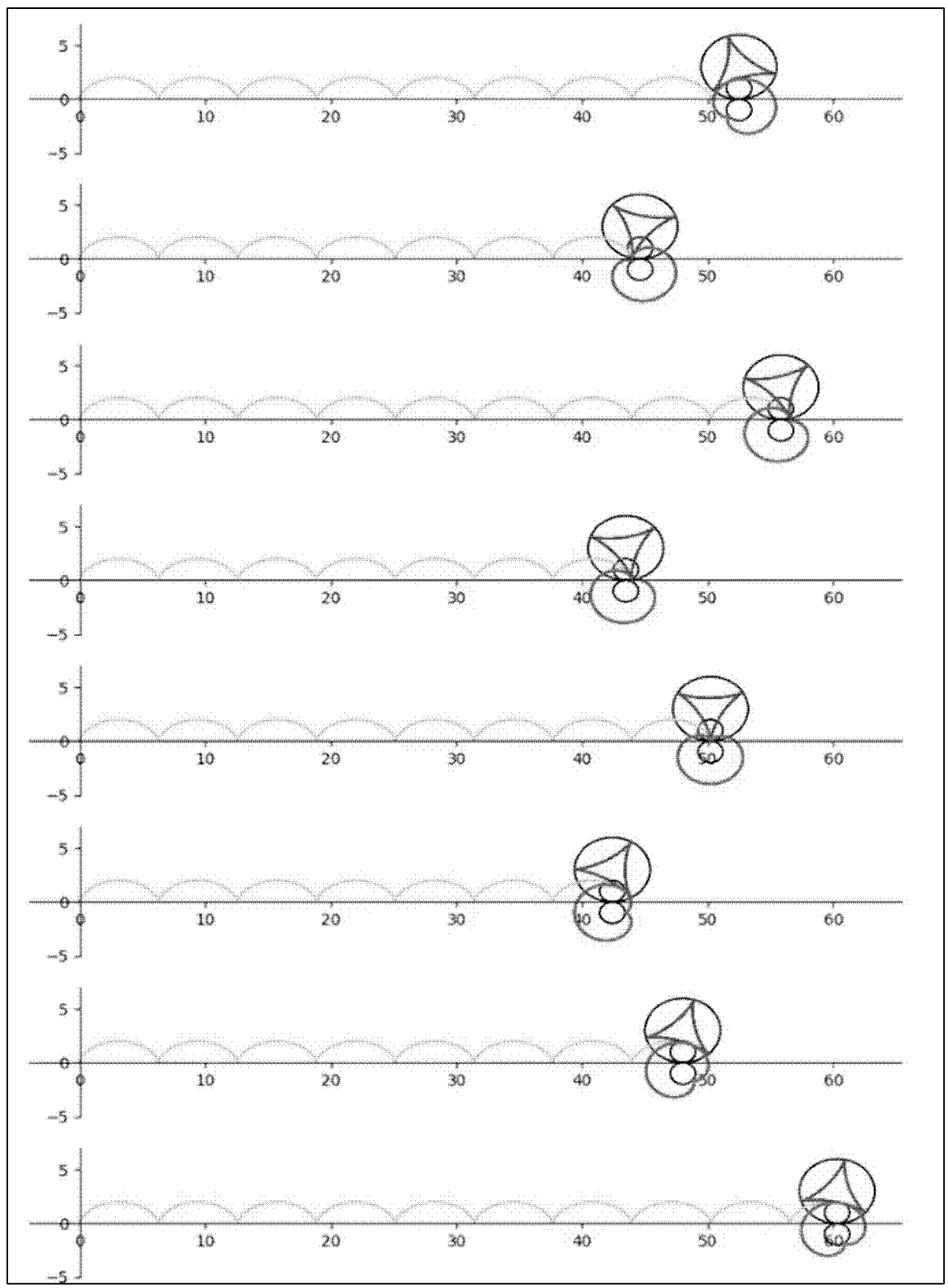

It is understood that the components, as generally described and illustrated in the Figures herein, may be arranged and designed in a wide variety of configurations. Thus, the following detailed description of the embodiments of the apparatus, system, and method, as presented in the Figures, is not intended to limit the scope of the invention, as claimed, but is merely representative of selected embodiments.

The functional unit described in this specification with elements labeled as managers. A manager may be implemented in programmable hardware devices such as field programmable gate arrays, programmable array logic, programmable logic devices, or the like. The manager may also be implemented in software for execution by various types of processors. An identified manager of executable code may, for instance, comprise one or more physical or logical blocks of computer instructions which may, for instance, be organized as an object, procedure, function, or other construct. Nevertheless, the executables of an identified manager need not be physically located together but may comprise disparate instructions stored in different locations which, when joined logically together, comprise the manager and achieve the stated purpose of the manager.

Indeed, a manager of executable code could be a single instruction, or many instructions, and may even be distributed over several different code segments, among different applications, and across several memory devices. Similarly, operational data may be identified and illustrated herein within the manager and may be embodied in any suitable form and organized within any suitable type of data structure. The operational data may be collected as a single data set or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, to provide a thorough understanding of embodiments. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments will be best understood by reference to the drawings, wherein like parts are designated by like numerals throughout. The following description is intended only by way of example, and simply illustrates certain selected embodiments of devices, systems, and processes that are consistent with the invention as claimed herein.

In the PCT/CN2019/124550, METHOD AND SYSTEM FOR INFORMED DECISION MAKING is provided. The present invention is based on the AMN disclosed in the PCT/CN2019/124550. The contents of the PCT patent application PCT/CN2019/124550 are all comprised into the present invention.

Programming of the AMN(s), FNN, Keynode Generation

The programming structure of the Artificial Mirror Neuron (AMN) or Node is tri-dimensional, which means 3 dimensions are drawn from 3 cognitive datapoints related to the performance of the user when exposed to a simple cognitive task, and repeatedly: the reaction time is captured in second, as a reaction to the cognitive task (between input and output) which determines the motor core radius size among 8 categories or integer 0-7; the emotional response is captured in emotional type, as a reaction to the same cognitive task which determines the sensory core radius size among 8 types or integer 0-7; the velocity is determined inversely to the age of the user in degree per minute. The angular velocity omega can be derived from the velocity and the theta angle of both motor and sensory cores.

When multiple nodes are programmed by the user, it forms a chain, and the nodes in the chain will start racing in the Functional Neural Network also called a KeyNode (KN) in this invention which has dynamics that serve as encryption device or cipher. The first KN1 should contain a minimum of 8 nodes and is programmed by the user at the time of account creation also called signup. FIGS. 1(a) and (b) describes the mechanism of the first KN of the present invention. FIG. 1(b), describes the changes of the value of angle θ of each node between two different times arbitrarily called time 1 (T1) and time 2 (T2), indicating the sum of all nodes angle θ Σθ2 at time 2 which contributes to the generation of the password to be used at time 2.

Each node is defined by the characteristics of a motor core radius; a sensory core radius, 2 theta angles, 2 velocities and 2 omega angular velocities.

Each node is defined by the time of its creation T in minute and each new node will have a specific time of creation T1+n that will refer to the initial nodes time of creation when made at signup or T1.

When a T2 or time of use of the password, a new node will be created by generation-elongation and all racing nodes in the KN arriving at T2 will have their dual cores' radiuses position or their angular velocities summed up and the final result or Password will be transmitted using a Json Web Token (JWT) to the preselected AppID where the password will be used for authentication.

Multiple Nodes Classifier

The present invention features an Identification by Chained Autonyms (ICA) where each autonym comprises multiple nodes held in a chain that can be used (generation), be increased in length (elongation) and be modified in length (evolution by retraction of nodes) according to preset rules after a certain number of nodes has been generated and computer power efficiency is reached. Chained autonyms are determined by the unique taxonomy of KeyNodes generated by a multiple node's classifier. ICA can also be used for tracking decision patterns.

Figure 2A:
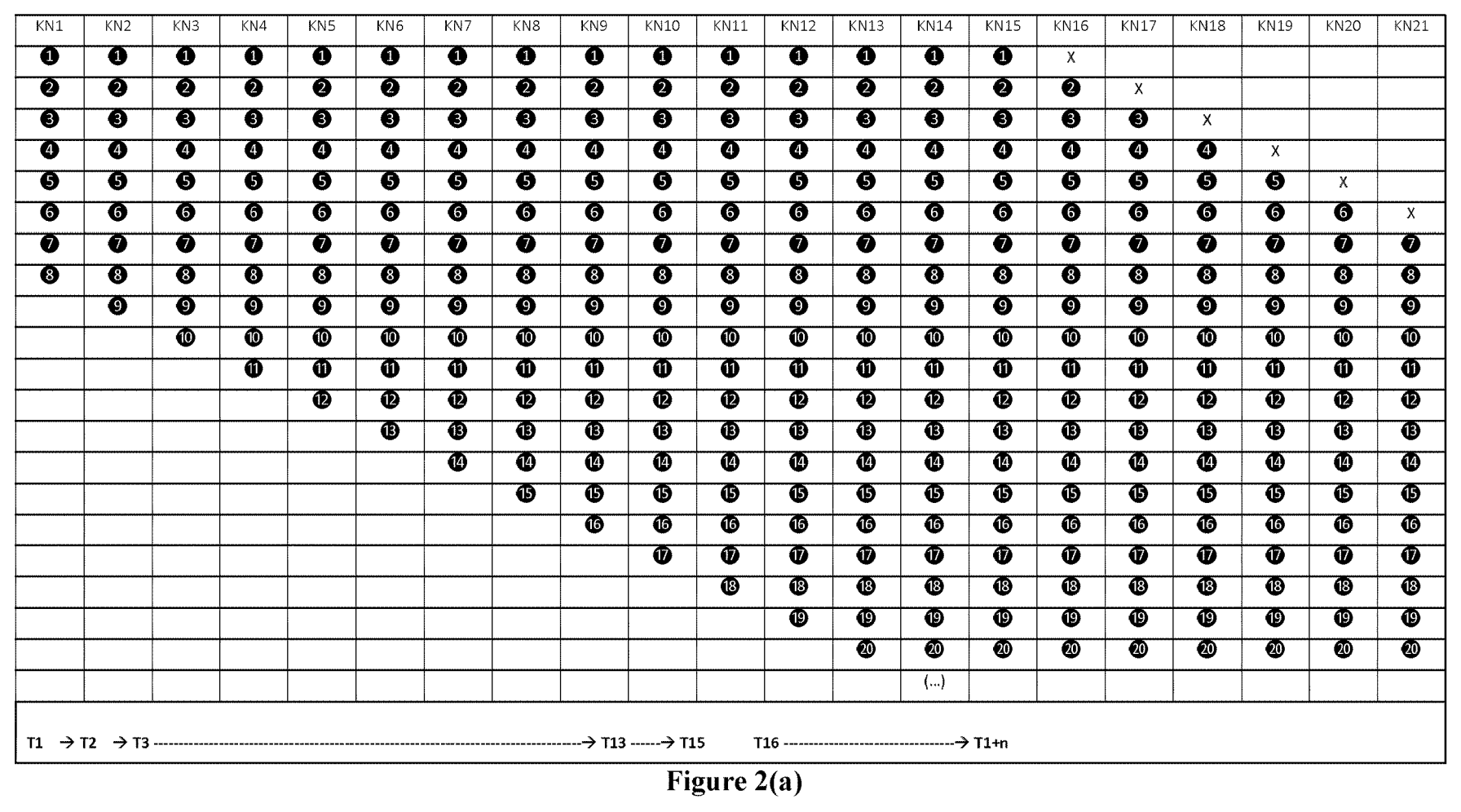

FIG. 2a describes the formation of chains of nodes (KN) or elongation by programming nodes up to maximum 22 nodes at T15 followed by a decay type 1 (see FIG. 4a) of nodes starting at T16 until T1+n.

Figure 2B:
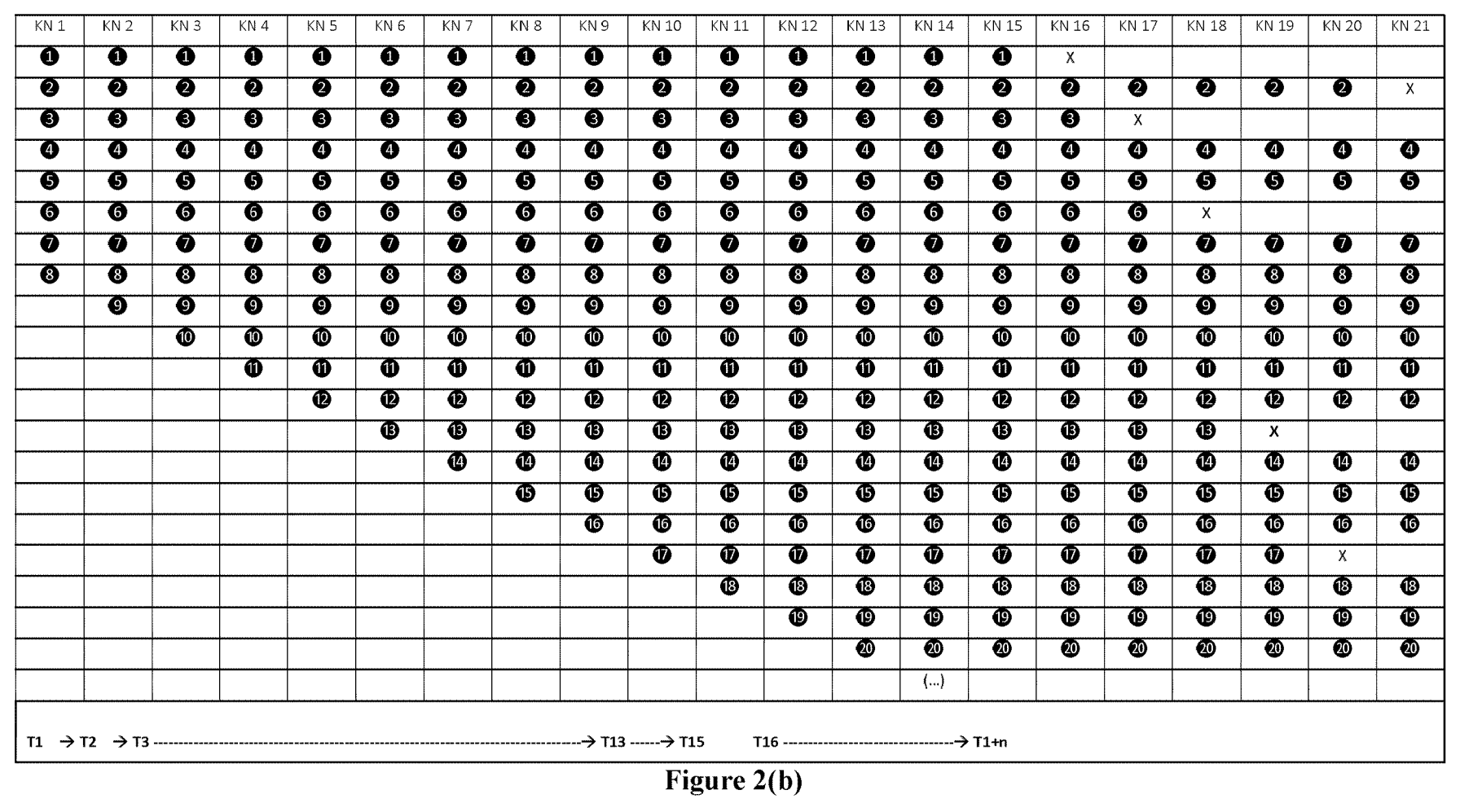

FIG. 2b describes the formation of chains of nodes (KN) or elongation by programming nodes up to maximum 22 nodes at T15 followed by decay type 2 (see FIG. 4b) of nodes starting at T16 until T1+n.

Encoding in Xenobase

The present invention introduces a new base for encoding keys called XenoBase which contains the infinite proposition captured by interactive cognitive computing.

New categories of encoding such as question answer-types, binary visual-choices, binary iconic-choices, ternary visual-choices are replacing the usual set of numbers, letters, and symbols of traditional bases.

Forming an irregular tetragon matrix, these nodes allow dynamic encoding of unusual form of KeyNodes so passwords can fit the preset security requirements in term of logic complexity, mutability, and timeliness.

The 12 Question answer-types or Qa, if NS=A; =B; HA=C; and bold fonts highlight the Major types

| TYPE Qa1  | A + C = A | TYPE Qa2  | A + C = C |
|-----------|-----------|-----------|-----------|
| TYPE Qa3  | A + B = A | TYPE Qa4  | A + B = B |
| TYPE Qa5  | B + C = B | TYPE Qa6  | B + C = C |
| TYPE Qa7  | B + A = B | TYPE Qa8  | B + A = A |
| TYPE Qa9  | C + A = C | TYPE Qa10 | C + A = A |
| TYPE Qa11 | C + B = C | TYPE Qa12 | C + B = B |

The 12 Binary visual-choices or Bv, if NS=A; =B; HA=C; and bold fonts highlight the Major types

| TYPE Bv1  | A + C = A | TYPE Bv2  | A + C = C |
|-----------|-----------|-----------|-----------|
| TYPE Bv3  | A + B = A | TYPE Bv4  | A + B = B |
| TYPE Bv5  | B + C = B | TYPE Bv6  | B + C = C |
| TYPE Bv7  | B + A = B | TYPE Bv8  | B + A = A |
| TYPE Bv9  | C + A = C | TYPE Bv10 | C + A = A |
| TYPE Bv11 | C + B = C | TYPE Bv12 | C + B = B |

The 12 Binary Iconic-choices or Ic, if NS=A; =B; HA=C; and bold fonts highlight the Major types

| TYPE Ic1  | A + C = A | TYPE Ic2  | A + C = C |
|-----------|-----------|-----------|-----------|
| TYPE Ic3  | A + B = A | TYPE Ic4  | A + B = B |
| TYPE Ic5  | B + C = B | TYPE Ic6  | B + C = C |
| TYPE Ic7  | B + A = B | TYPE Ic8  | B + A = A |
| TYPE Ic9  | C + A = C | TYPE Ic10 | C + A = A |
| TYPE Ic11 | C + B = C | TYPE Ic12 | C + B = B |

The 18 Ternary visual-choices or Tv, if NS=A; =B; HA=C; Major/minor types are not separated

| TYPE Tv1  | A + B + C = A |
|-----------|---------------|
| TYPE Tv2  | A + B + C = B |
| TYPE Tv3  | A + B + C = C |
| TYPE Tv4  | A + C + B = A |
| TYPE Tv5  | A + C + B = C |
| TYPE Tv6  | A + C + B = B |
| TYPE Tv7  | B + A + C = B |
| TYPE Tv8  | B + A + C = A |
| TYPE Tv9  | B + A + C = C |
| TYPE Tv10 | B + C + A = B |
| TYPE Tv11 | B + C + A = C |
| TYPE Tv12 | B + C + A = A |
| TYPE Tv13 | C + A + B = C |
| TYPE Tv14 | C + A + A = A |
| TYPE Tv15 | C + A + A = B |
| TYPE Tv16 | C + B + A = C |
| TYPE Tv17 | C + B + A = B |
| TYPE Tv18 | C + B + A = A |

The combination forms an irregular quadrilateral polygon or tetragon matrix FIG. 3 describes the encoding of KN in XenoBase, using 4 different colors to identify the components. Qa in red, By in green, Ic in yellow, and Tv in blue. It can be preset such as "QaBvBvQaQaTvQalc" or made by random selection.

The KN can also be programmed according preset security requirements in term of length, and combinations can be set at first before the user starts programming the first KeyNode.

Keynode Decay Mechanisms

FIG. 4a illustrates linear decay or simple retraction (type 1) taking place between KeyNode 16 and KeyNode 21. Linear decay means that the earlier a node is generated, the earliest the node will be removed. Therefore, the removal of nodes starts from the first node, and then the second, etc., in linear order.

FIG. 4b illustrates random decay or disorganized retraction (type 2) taking place between KeyNode 16 and KeyNode 21. Random decay or disorganized retraction is capable of selecting one node from the list of existing nodes in the KeyNode every time and remove it. This can be expressed as a selection from the existing nodes each with a uniform probability 1/N to be selected if N is the number of existing nodes.

FIG. 4c illustrates preset decay or organized retraction, ex: 1-3-6/2-4-7 (type 3) taking place between KeyNode 16 and KeyNode 21. Preset decay or organized retraction is similar to linear decay that it can remove one node in a fixed order but differs in the sense that linear decay removes the nodes based on the time they are generated while preset decay removes the node based on a preset order in which the generation time is not important. It can be the 1st node removed, then the $3^{rd}$ node and the $6^{th}$, etc.

FIG. 4d illustrates the binomial distributed decay or probabilistic retraction with expectation of 1 node removed per time (type 4) taking place between KeyNode 16 and KeyNode 21. Binomial distributed decay or probabilistic retraction sets a removal probability to each existing node, and the whole removal process follows a binomial distribution with expectation to be 1 node removed each time.

Authentication Mechanism Formulation:

The KeyNode generation by the user is lower bounded by the minimum KN size, called A, and is upper bounded by a maximum size, called B for which we keep some flexibility. If $T_1$ is the time of generation, or signup, then the time of maximum size, called C, will be C=B−(A−1).

For example, if B=20 and A=8, time of maximum size should be C=20−(8−1)=13. Once the KeyNode reaches the maximum size, the decay mechanism should start to ensure that the KeyNode size remains stable around the maximum size.

The formulation of the nodes is based entirely on the formulation of the Functional Neural Network FNN. Even though we know that FNN can have predictive power on decision making of the users, the current formulation will simply focus on the pure functionalities of the FNN.

Each Artificial Mirror Neuron (AMN) of the FNN has two cores, namely, the motor core M and sensory core S. The password generation will combine the values of both cores and can either use the theta angle or the angular velocity of the motor and the sensory cores can be used, and the details are provided below in FIG. 5.

Figure 5:
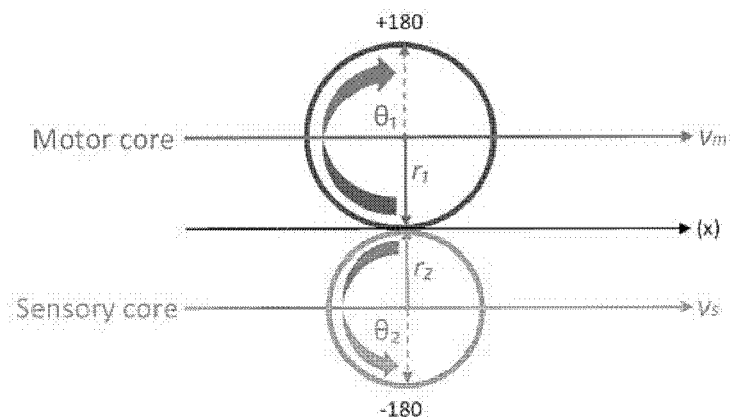
FIG. 5 illustrates theta angle or angular velocity of the motor and sensory cores used in the present invention.

FIG. 5 illustrates the mirror structure of the AMN with the motor and sensory cores.

Figure 6:
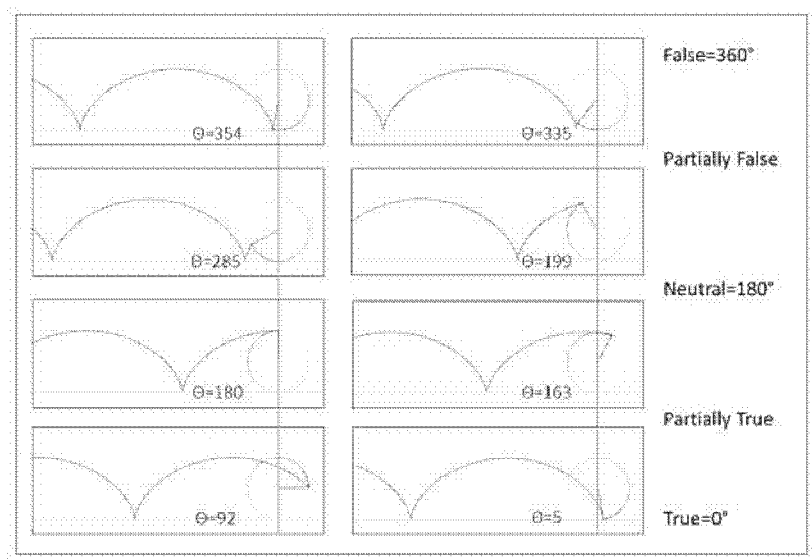
FIG. 6 illustrates the many-valued theta angle of the motor core during a complete revolution of the present invention.

FIG. 6 illustrates the many-valued theta angle of the motor core during a complete revolution 1. Theta Angle Per Core For the motor cores, the following steps are provided:

Individual theta angle from $M$ of each node at time $T = (v_m T)\%(2\pi r_1)$

Sum of theta angles from $M$ of the whole FNN at time $T =$ $$\frac{1}{N_T}\sum_{i=0}^{N_T}(v_{mi}T)\%(2\pi r_{1i})$$

where $v_m$ is the velocity of the motor core in an AMN, $v_{mi}$ is the velocities of the motor core of the i-th node in the FNN, $r_1$ is the radius of the motor core in an AMN, $r_{1i}$ is the radius of the motor core of the i-th node in the FNN, and $N_T$ is the number of nodes in FNN at time T.

Similarly, for the sensory cores, the following steps are provided:

Individual theta angle from $S$ of each node at time $T = (v_s T)\%(2\pi r_2)$

Sum of theta angles from $S$ of the whole FNN at time $T =$ $$\frac{1}{N_T}\sum_{i=0}^{N_T}(v_{si}T)\%(2\pi r_{2i})$$

where $v_s$ is the velocity of the sensory core in an AMN, $v_{si}$ is the velocities of the sensory core of the i-th node in the FNN, $r_2$ is the radius of the sensory core in an AMN, $r_{2i}$ is the radius of the sensory core of the i-th node in the FNN, and $N_T$ is the number of nodes in FNN at time T.

Figure 7:
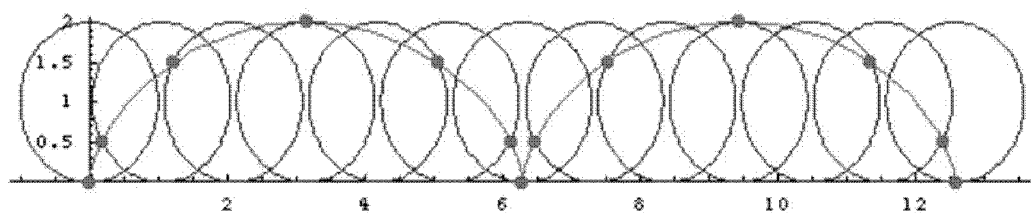
FIG. 7 illustrates the changes of the angular velocity value during the course of the motor core of the present invention.

FIG. 7 illustrates the changes of the value of the angular velocity during the course of the motor core over time.

2. Angular Velocity per core

For the motor cores, the following steps are provided:

Individual angular velocity from $M$ of each node at time $T = \frac{v_m}{2\pi r_1}$ Sum of angular velocities from $M$ of the whole FNN at time $T =$ $$\frac{1}{N_T}\sum_{i=0}^{N_T}\frac{v_{mi}}{2\pi r_{1i}}$$

where $v_m$ is the velocity of the motor core in an AMN, $v_{mi}$ is the velocities of the motor core of the i-th node in the FNN, $r_1$ is the radius of the motor core in an AMN, $r_1$ is the radius of the motor core of the i-th node in the FNN, and $N_T$ is the number of nodes in FNN at time T.

Similarly, for the sensory cores, the following steps are provided:

Individual angular velocity from $S$ of each node at time $T = \frac{v_s}{2\pi r_2}$ Sum of angular velocities from $S$ of the whole FNN at time $T =$ $$\frac{1}{N_T}\sum_{i=0}^{N_T}\frac{v_{si}}{2\pi r_{2i}}$$

where $v_s$ is the velocity of the sensory core in an AMN, $v_{si}$ is the velocities of the sensory core of the i-th node in the FNN, r2 is the radius of the sensory core in an AMN, $r_{2i}$ is the radius of the sensory core of the i-th node in the FNN, and $N_T$ is the number of nodes in FNN at time T.

There are four categories of encoding in the XenoBase, namely, the Question answer-types (Qa), the Binary visual-choices (Bv), the binary Iconic-choices (Ic) and the Ternary visual-choices (Tv). Each time the user will be randomly prompted to answer a question or make a choice from either one of these four categories, which will then generate a new node in the KeyNode as we have discussed. Therefore, the cipher will combine the reactional nature of the response given by the user to a question/choice, each one at a time, with the timeliness of the response so each time a new question/choice is submitted and an answer is captured, a new node appears and refreshes the FNN.

In more details, KN elongation is made by addition of new nodes, i.e. 1 new node per each password generation. The new node generated at each time step will not affect the password at time it is generated, but only affect the future passwords.

For example, if at time $T_1$ there are $N_{T_1}$ nodes and user answers a question of one from XenoBase which starts a new node, this $N_{T_1}+1$ th node will not be accounted for the password at time $T_1$ but for future passwords only, for example time $T_2$. So, in mathematical formulation, we have theta angles at time $T_1$:

Sum of theta angles from M of the whole FNN at time $$T_1 = \frac{1}{N_{T_1}} \sum_{i=0}^{N_{T_1}} (v_{mi}T_1)\%(2\pi r_{1i})$$

and theta angles at time $T_2$:

Sum of theta angles from S of the whole FNN at time $$T_2 = \frac{1}{N_{T_2}} \sum_{i=0}^{N_{T_2}} (v_{mi}T_2)\%(2\pi r_{1i})$$

where $N_{T_2}=N_{T_1}+1$.

Similarly, if we are considering angular velocities, we have angular velocities at time $T_1$:

Sum of angular velocities from M of the whole FNN at time $$T_1 = \frac{1}{N_{T_1}} \sum_{i=0}^{N_{T_1}} \frac{v_{mi}}{2\pi r_{1i}}$$

and angular velocities at time $T_2$:

Sum of angular velocities from S of the whole FNN at time $$T_2 = \frac{1}{N_{T_2}} \sum_{i=0}^{N_{T_2}} \frac{v_{si}}{2\pi r_{2i}}$$

where $N_{T_2}=N_{T_1}+1$.

The decay mechanism of nodes is modelled to adopt different forms with different properties. They include linear decay (simple retraction), random decay (disorganized retraction), preset decay (organized retraction) and binomial distributed decay (probabilistic retraction).

1. Linear decay

Linear decay or simple retraction means that the earlier a node is generated, the earliest the node will be removed. Therefore, the removal of nodes starts from the first node, and then the second, etc., in linear order.

2. Random decay

Random decay or disorganized retraction is capable to select one node from the list of existing nodes in the KeyNode every time and remove it. This can be expressed as a selection from the existing nodes each with a uniform probability $$\frac{1}{N}$$

to be selected if N is the number of existing nodes. So, we select a number from [1, 2, 3, . . . , N] each with probability $$\frac{1}{N}.$$

3. Preset Decay

Preset decay or organized retraction is similar to linear decay that it can remove one node in a fixed order but differs in the sense that linear decay removes the nodes based on the time they are generated while preset decay removes the node based on a preset order in which the generation time is not important. It can be the 1st node removed, then the $3^{rd}$ node and $6^{th}$, etc.

4. Binomial distributed decay

Binomial distributed decay or probabilistic retraction sets a removal probability to each existing node, and the whole removal process follows a binomial distribution with the expectation to be 1 node removed each time. In details, we set the removal probability to be $$\frac{1}{N}$$

for each node, but unlike the random decay, it is not a selection problem from [1, 2, 3, . . . , N]. Instead, each node can be removed independently with probability $$\frac{1}{N}.$$

So, it is possible that 0 node is removed at this time and 2 nodes or more will be removed at the next time. The number of nodes to be removed indeed follows a binomial distribution, which explains why it is called binomial distributed decay. Mathematically, if there are N existing nodes, the probability of removing K nodes (K can be 0, 1, . . . , N) is $$\text{Probability } (k \text{ nodes to be removed}) = \binom{N}{k}\frac{1}{N}^k\left(1-\frac{1}{N}\right)^{N-k}$$

One intriguing property of this binomial distributed decay is that although the number of removed nodes each time is not fixed to be 1, the expectation of number of nodes to be removed each time is 1.

Expectaction (number of nodes to be removed) =

$$\sum_{k=0}^{N} k \binom{N}{k} \frac{1}{N}^{k} \left(1 - \frac{1}{N}\right)^{N-k} = 1$$

The expectation is a sophisticated statistical concept for measuring the central tendency of the randomness over a long period of time. In other words, if the password generator runs long enough, which will if the user uses it long enough, the expected number of nodes removed each time is simply 1. Therefore, we can safely use this binomial distributed decay similar to other decay mechanism.

Lastly, the password formulation will be the sum of values generated by the FNN (both the motor and sensory cores) and it can either be theta angles or angular velocities. In mathematical formulations, we have 1. Theta Angles for Password Password at time $T = \frac{1}{N_T} \sum_{i=0}^{N_T} (v_{mi}T)\%(2\pi r_{1i}) + \frac{1}{N_T} \sum_{i=0}^{N_T} (v_{Si}T)\%(2\pi r_{2i})$ 2. Angular Velocities for Password Password at time $T = \frac{1}{N_T} \sum_{i=0}^{N_T} \frac{v_{mi}}{2\pi r_{1i}} + \frac{1}{N_T} \sum_{i=0}^{N_T} \frac{v_{si}}{2\pi r_{2i}}$ where $v_{mi}$ is the velocities of the motor core of the i-th node in the FNN, $r_1$ is the radius of the motor core of the i-th node in the FNN, $v_{si}$ is the velocities of the sensory core of the i-th node in the FNN, $r_{2i}$ is the radius of the sensory core of the i-th node in the FNN and $N_T$ is the number of nodes in FNN at time T.

In one embodiment of the present invention, password is generated by using KeyNode according to the following sequence:

at T1+n→(KN1+n)→Password→JWT→Receiver

Json Web Token will carry the encapsulated password (of KeyNode1+n) which is the complex sum theta (degree) or omega (degree per minute) at $T_2$, $T_3$, etc., to the receiver when/where the usage takes place.

Password use-case 1: offline authentication in-tandem with biometric facial recognition (at the door)

Password use-case 2: online authentication when JWT carries the password (of KeyNode1+n) to the receiver at the time of use either for 1FA or 2FA with facial recognition or another Factor Authentication.

In another embodiment of the present invention, one-time decryption key or private key can also be produced by KeyNode.

The previous section has been confined to the use of KeyNode algorithm for one-time password generation. Although one-time password generation is admittedly one of the most popular password algorithms in practice nowadays, one-time password alone is not sufficient, especially when one has some data or information for which one would like to have additional security and protection. In this case encryption and decryption of information or data by the authorized parties become necessary.

Encryption is the process of encoding information or data. This process converts the original representation of the information a.k.a. plaintext, into a ciphertext. So, the authorized party will be able to decrypt the ciphertext and return to the original plaintext i.e. access to the original information or data. The process of encrypting and decrypting messages involves keys. There are two main types of keys involved, namely, symmetric key and public key a.k.a. asymmetric key.

The following paragraph refers to some common encryption and decryption algorithms and their corresponding types of key involved:

Existing Encryption and Decryption algorithms:

1. Symmetric Key

Encryption and decryption keys are the same. Communicating parties must have the same keys in order to encrypt or decrypt the data or information. However, because of having the encryption key means also having the decryption key, anyone who has access to the encryption key can decrypt and read the information or data even when not authorized to. For example, if A is the receiver of messages sent from 2 separated senders B and C, C could decrypt and read the data in the message sent by B to A and vice versa, showcasing the deficiency of such symmetric key algorithm. Another potential issue would be if C accidentally leaks the encryption key so anyone could decrypt and read the data or information sent to A because decryption key and encryption key are the same. For such reasons, asymmetric key a.k.a. public key was developed.

2. Public Key

At the beginning, the receiving party will design its own encryption key and decryption key. Thereafter the receiving party will broadcast the encryption key to anyone who wants to communicate with the receiving party can use this public key to encrypt the information or data before sending them. Because only the receiving party has access to the decryption key, it will be the only party who will be able to decrypt the information or data contained in the messages using the public key for encryption. Note that having the encryption key gives no information about the decryption key at all, so even if the encryption key is accidentally leaked, there will be no risk of leaking the encrypted data or information.

Public key algorithm is now the mainstream encryption algorithm in use particularly because of the extra protection offered by the asymmetry of the keys. RSA (Rivest—Shamir—Adleman) is the most coveted public key encryption algorithm because it is using number theory results in the generation of the encryption key from a user-selected or a randomly generated decryption key to make sure knowing the encryption key cannot give any information about the decryption key.

Another popular example of public key encryption algorithm is the elliptic-curve cryptography (ECC) which generates encryption keys from the user-selected or randomly generated decryption keys based on some algebraic results of elliptic curves.

Comparison of RSA with ECC

The difference between RSA and ECC encryption keys is the length of key for the same security. The table below compares key's sizes for the same level of security by RSA and ECC, respectively. For example, a ECC key of 160 bit achieves the same level of security of an RSA key of 1024 bit. Table 1 provides details:

| RSA Key Length (bit) | ECC Key Length (bit) |
|---|---|
| 1024 | 160 |
| 2048 | 224 |
| 3072 | 256 |
| 7680 | 384 |
| 15360 | 521 |

Note that the relationship between the size of ECC keys and RSA keys is not linear. Because of this difference in key size, ECC key generation, encryption and decryption is substantially quicker and require less computer power and memory than for RSA.

Compared to RSA, ECC allows smaller ciphertext, key, and signature, and faster generation of keys and signatures. Its decryption and encryption speeds are slightly faster.

The present invention applies KeyNode in scenarios where encryption and decryption are necessary for guaranteeing the confidentiality of data and information. Although KeyNode is used for generation of one-time password through a mechanism that involves the response of the user to questions from the list of Question answer-types (Qa) or to single choices from the list of choices whether Binary visual-choices (Bv), Binary Iconic-choices (Ic), or Ternary visual-choices (Tv). The chain of nodes or KeyNode will increase in size by one node each time the user gives a response to a new question or make a choice, and a decay mechanism will be put in motion at a certain time to maintain the size of the KeyNode within certain range. Each time the one-time password will be generated according to the theta angles or angular velocities of the nodes in the KeyNode.

Theta angles for password $$\text{Password at time } T = \frac{1}{N_T}\sum_{i=0}^{N_T}(v_{mi}T)\%(2\pi r_{1i}) + \frac{1}{N_T}\sum_{i=0}^{N_T}(v_{Si}T)\%(2\pi r_{2i})$$

Angular velocities for password $$\text{Password at time } T = \frac{1}{N_T}\sum_{i=0}^{N_T}\frac{v_{mi}}{2\pi r_{1i}} + \frac{1}{N_T}\sum_{i=0}^{N_T}\frac{v_{si}}{2\pi r_{2i}}$$

where vim is the velocities of the motor core of the i-th node in the FNN, $r_1$ is the radius of the motor core of the i-th node in the FNN, $v_{si}$ is the velocities of the sensory core of the i-th node in the FNN, $r_{2i}$ is the radius of the sensory core of the i-th node in the FNN and $N_T$ is the number of nodes in the FNN at time T.

In order to make use of the KeyNode system in encryption and decryption algorithm, KeyNode one-time password can be used as a one-time decryption key. In other words, each time a user wants to set up a new decryption key, the user can answer a new question/choice that sets a new one-time password which will be treated then as a user-selected decryption key a.k.a. private key.

The generated decryption key can be fed into any RSA or ECC encryption algorithm to generate the corresponding one-time encryption key. As said already, the encryption key will not leak any information about the decryption key at all. The user can then broadcast the one-time encryption key to any parties who want to encrypt data or information and send the encrypted ciphertext to the user.

Figure 8:
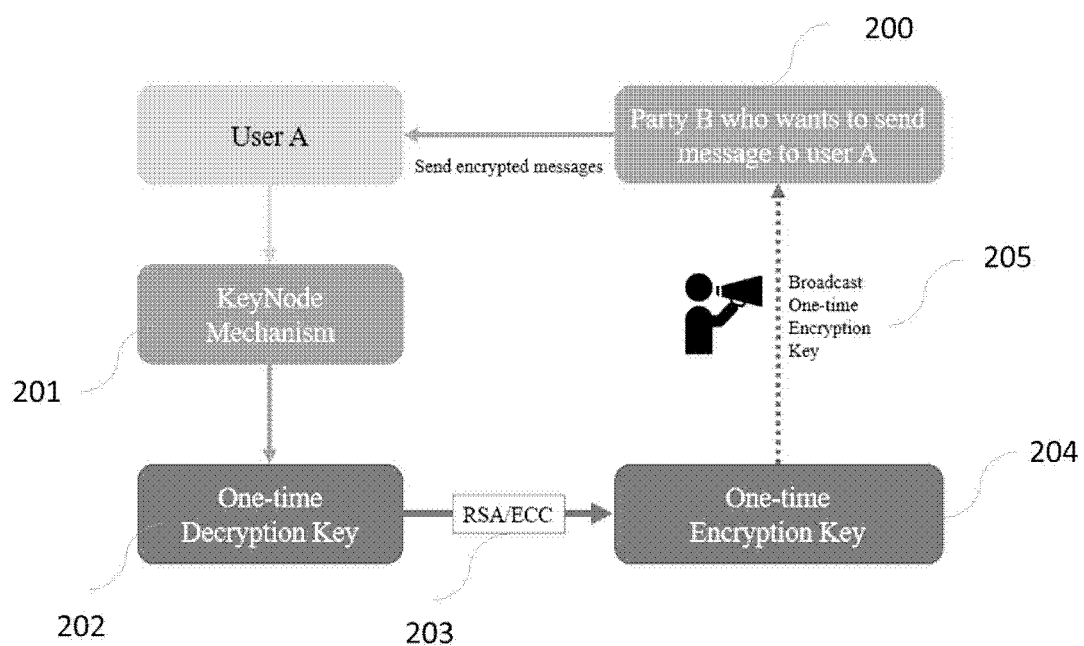
FIG. 8 describes the workflow of the present invention.

The FIG. 8 below describes the workflow of generation and use of the one-time decryption/encryption pair of keys of the present invention. In step 201, at the beginning, user A initiates the KeyNode mechanism. In Step 202, after answering a question/choice and giving the response/choice, the KeyNode mechanism will generate a one-time decryption key for user A in the following way:

Theta angles for one-time decryption key

One–time decryption key at time $T = $ $$\frac{1}{N_T}\sum_{i=0}^{N_T}(v_{mi}T)\%(2\pi r_{1i}) + \frac{1}{N_T}\sum_{i=0}^{N_T}(v_{Si}T)\%(2\pi r_{2i})$$

Angular velocities for one-time decryption key $$\text{One–time decryption key at time } T = \frac{1}{N_T}\sum_{i=0}^{N_T}\frac{v_{mi}}{2\pi r_{1i}} + \frac{1}{N_T}\sum_{i=0}^{N_T}\frac{v_{si}}{2\pi r_{2i}}$$

where $v_{mi}$ is the velocities of the motor core of the i-th node in the FNN, $r_{1i}$ is the radius of the motor core of the i-th node in the FNN, $v_{si}$ is the velocities of the sensory core of the i-th node in the FNN, $r_{2i}$ is the radius of the sensory core of the i-th node in the FNN and $N_T$ is the number of nodes in at time T.

In Step 203, the generated one-time decryption key will pass through either RSA or ECC systems to generate a corresponding one-time encryption key in step 204.

Theta Angles for One-Time Encryption Key

One–time Encryption key at a time $T$ for $RSA =$ $$RSA\left(\frac{1}{N_T}\sum_{i=0}^{N_T}(v_{mi}T)\%(2\pi r_{1i}) + \frac{1}{N_T}\sum_{i=0}^{N_T}(v_{Si}T)\%(2\pi r_{2i})\right)$$

or

One–time Encryption key at time $T$ for $ECC =$ $$ECC\left(\frac{1}{N_T}\sum_{i=0}^{N_T}(v_{mi}T)\%(2\pi r_{1i}) + \frac{1}{N_T}\sum_{i=0}^{N_T}(v_{Si}T)\%(2\pi r_{2i})\right)$$

Angular velocities for One-time Encryption key

One–time Encryption key at a time $T$ for $RSA =$ $$RSA\left(\frac{1}{N_T}\sum_{i=0}^{N_T}\frac{v_{mi}}{2\pi r_{1i}} + \frac{1}{N_T}\sum_{i=0}^{N_T}\frac{v_{si}}{2\pi r_{1i}}\right)$$

or

One–time Encryption key at time $T$ for $ECC =$ $$ECC\left(\frac{1}{N_T}\sum_{i=0}^{N_T}\frac{v_{mi}}{2\pi r_{1i}} + \frac{1}{N_T}\sum_{i=0}^{N_T}\frac{v_{si}}{2\pi r_{1i}}\right)$$

where RSA( ) is the RSA function for generating encryption key from decryption key, and ECC( ) is the ECC function for generating encryption key from decryption key, $v_{mi}$ is the velocities of the motor core of the i-th node in the FNN, $r_1$ is the radius of the motor core of the i-th node in the FNN, $v_{si}$ is the velocities of the sensory core of the i-th node in the FNN, $r_{2i}$ is the radius of the sensory core of the i-th node in the FNN and $N_T$ is the number of nodes in the FNN at time T.

In step 205, this one-time encryption key is then broadcasted to any parties who want to send an encrypted message over to user A.

In step 200, selected parties, such as party B, can start encryption of the data or information with the one-time encryption key and send them to user A who will be the only person to be able to decrypt the encrypted data or information.

Each time user A wants someone to send over encrypted data or information again, user A can repeat the same process from step 201 to step 205 for utmost security protection.

Note that the main benefits offered by KeyNode itself are extended to the private key generation, the user no longer has to memorize his own private key in order to decrypt encrypted messages. All the user A has to do is to answer a new question/make a new choice to generate a new node for the KeyNode each and every time the user A wants to generate a decryption key (and the corresponding encryption key).

The user is now free from any burden of memorizing passwords and decryption keys.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Python, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, the enhanced assessment module supports cognitive and behavioral assessment of a participant subject in the field, and at the same time provides a unique employment of test and associated test batteries for the assessment.

As used herein, "one embodiment," "an embodiment," or "one or more embodiments" means that a particular feature, structure, or characteristic described in connection with the embodiment is included in at least one embodiment of the present invention. Also, please note that the examples of the words "in one embodiment" do not completely refer to the same embodiment.

It will be appreciated that, although specific embodiments of the invention have been described herein for purposes of illustration, various modifications may be made without departing from the spirit and scope of the invention. Accordingly, the scope of protection of this invention is limited only by the following claims and their equivalents.

The present invention can be applied to secure i.e. prevent hacking of personal data or theft of corporate information/secrets in online and mobile communication especially at the dawn of 5G with generalization of open API lifestyle platforms, to encrypt smart city identification such as smartID for smart citizen, to protect personal health data, to enable more data transfer for smart banking and smart finance, to fight industrial espionage, to allow real-time identification for digital cryptocurrency payments and other public distributed ledger technology (DLT) mechanisms.

The invention claimed is:

1. An encryption method comprising:
generating a Functional Neural Network (FNN) or Key-Node (KN) of the system by programming a chain of multiple nodes also called Artificial Mirror Neurons (AMN) based on captured information of reaction time and emotional response to a simple task; racing the chain of multiple nodes in the FNN KN as an encryption device or cipher; generating a password based on the sum of intrinsic values of the chain of multiple nodes in the racing network at the time of using the encryption method and adopting the generated password for authentication;

classifying the chains of multiple nodes through an identification by chained autonyms (ICA) mechanism where each autonym comprises multiple nodes held in a chain which can be generated, elongated, and can also evolve by retraction of nodes or decay after a certain number of nodes has been generated;

encoding the FNN or KN based on KeyNodes based on infinite proposition captured by interactive cognitive computing, forming an irregular tetragon matrix, and allowing dynamic encoding of unusual form of cryptography;

generating a boundary of the KN, where a minimum size of the boundry is defined as A, a maximum size of the boundary is defined as B, and the time of maximum size of the KN is defined as $C=B-(A-1)$;

generating a one-time decryption key based on said encoded FNN or KN that can generate a one-time encryption key and form a one-time pair of decryption and encryption keys (private and public keys) for encrypted communication;

transmitting the one-time encryption key (public key) over any unsecured channel to selected senders for encrypting a plaintext to become a ciphertext;

decrypting the ciphertext of the senders at a receiver's end using the one-time decryption key (private key) to generate plaintext data.

2. The method as claimed in claim 1, wherein,
the step of programming a chain of multiple nodes also called AMN, further comprising capturing the reaction time as a reaction to a cognitive task between input and output, which determines a motor core radius size; capturing the emotional response in emotional type as a reaction to the said cognitive task, which determines a sensory core radius size; and determining a velocity which is inversely to an age information; and deriving an angular velocity $\omega$ from said velocity and an the angle $\theta$ of both said motor core and sensory core;

the step of racing the chain of nodes in the FNN or KN, further comprising programming multiple nodes, and the chain of nodes in the FNN KN serves as an encryption device or a cipher; said KN comprise one first signup KN or KN1 which contains at least 8 nodes;

the step of generating the password, further comprising generating said password for use at time 2 (T2), on the base of each node angle $\theta$ changes constantly between time 1 (T1) and time 2 (T2), and the sum of angle $\theta$ of all nodes also called sum of angle $\theta 2$ at time 2 depends on the position of the radiuses or the value of the velocities of the nodes at time 2; and the method further comprising defining each node by said motor core radius, said sensory core radius, two angle $\theta 1$ and angle $\theta 2$, two velocity v1 and velocity v2, and two angular velocity $\omega 1$ and angular velocity $\theta 2$ at the time T1 and T2, and the time of each node creation in minute and each new node has a specific time of creation T1+n that will refer to the initial nodes time of creation when made at signup or T1; and when reaching the time T2 or time of applying said password, creating a new node by generation-elongation, and summing up said motor core radius and said sensory core radius or angular velocities for all racing nodes in the KN arriving at T2, and adopting said password for authentication.

3. The method as claimed in claim 2, further comprising, transmitting said password through a Json Web Token (JWT) to the receiver for authentication.

4. The method as claimed in claim 1, wherein, each node could decay or be retracted according to the following mechanisms: linear decay or simple retraction, random decay or disorganized retraction, preset decay or organized retraction, or binomial distributed decay or probabilistic retraction.

5. The method as claimed in claim 2, using the angle θ for password:

$$\text{Password at time } T = \frac{1}{N_T}\sum_{k=0}^{N_T}(v_{mi}T)\%(2\pi r_{1i}) + \frac{1}{N_T}\sum_{k=0}^{N_T}(v_{Si}T)\%(2\pi r_{2i})$$

using the angular velocities w for password is:

$$\text{Password at time } T = \frac{1}{N_T}\sum_{k=0}^{N_T}\frac{v_{mi}}{2\pi r_{1i}} + \frac{1}{N_T}\sum_{k=0}^{N_T}\frac{v_{si}}{2\pi r_{2i}}$$

where $v_{mi}$ is the velocities of the motor core of the i-th node in the FNN, $r_{1i}$ is the radius of the motor core of the i-th node in the FNN, $v_{si}$ is the velocities of the sensory core of the i-th node in the FNN, $r_{2i}$ is the radius of the sensory core of the i-th node in the FNN and $N_T$ is the number of nodes in FNN at time T.

6. The method as claimed in claim 2, wherein for the motor cores, the following steps are provided:

individual angle theta from M of each node at time $T = (v_m T)\%(2\pi r_1)$ sum of angles theta from M of the whole FNN at time $T =$ $$\frac{1}{N_T}\sum_{k=0}^{N_T}(v_{mi}T)\%(2\pi r_{1i})$$

where $v_m$ is the velocity of the motor core in an AMN, $v_{mi}$ is the velocities of the motor core of the i-th node in the FNN, $r_1$ is the radius of the motor core in an AMN, $r_{1i}$ is the radius of the motor core of the i-th node in the FNN, and $N_T$ is the number of nodes in FNN at time T.

7. The method as claimed in claim 2, wherein for the sensory cores, the following steps are provided:

individual angle theta from S of each node at time $T = (v_s T)\%(2\pi r_2)$ sum of angles theta from S of the whole FNN at time $T =$ $$\frac{1}{N_T}\sum_{k=0}^{N_T}(v_{si}T)\%(2\pi r_{2i})$$

where $v_s$ is the velocity of the sensory core in an AMN, $v_{si}$ is the velocities of the sensory core of the i-th node in the FNN, $r_2$ is the radius of the sensory core in an AMN, $r_{2i}$ is the radius of the sensory core of the i-th node in the FNN, and $N_T$ is the number of nodes in FNN at time T.

8. The method as claimed in claim 2, wherein for the angular velocity per core, the following steps are provided:

individual angular velocity from M of each node at time $T = \frac{v_m}{2\pi r_1}$ sum of angular velocities from M of the whole FNN at time $T =$ $$\frac{1}{N_T}\sum_{k=0}^{N_T}\frac{v_{mi}}{2\pi r_{1i}}$$

where $v_m$ i the velocity of the motor core in an AMN, $v_{mi}$ is the velocities of the motor core of the i-th node in the FNN, $r_1$ is the radius of the motor core in an AMN, $r_{1i}$ is the radius of the motor core of the i-th node in the FNN, and $N_T$ is the number of nodes in FNN at time T;

Similarly, for the sensory cores, the following steps are provided:

individual angular velocity from S of each node at time $T = \frac{v_s}{2\pi r_2}$ sum of angular velocities from S of the whole FNN at time $T =$ $$\frac{1}{N_T}\sum_{k=0}^{N_T}\frac{v_{si}}{2\pi r_{2i}}$$

where $v_s$ is the velocity of the sensory core in an AMN, $v_{si}$ is the velocities of the sensory core of the i-th node in the FNN, $r_2$ is the radius of the sensory core in an AMN, $r_{2i}$ is the radius of the sensory core of the i-th node in the FNN, and $N_T$ is the number of nodes in FNN at time T.

9. The method as claimed in claim 1, wherein in the step of encoding KNs based on infinite proposition captured by interactive cognitive computing, there are four encoding categories such as Question answer-types (Qa), Binary visual-choices (Bv), binary Iconic-choices (Ic) and Ternary visual-choices (Tv) to form the irregular tetragon matrix; generating a new node in the KN according to the output from one of these four types, producing a cipher combining both the reactional nature and the timeliness of KN and refreshing the FNN with a new node.

10. The method as claimed in claim 2, wherein if at time $T_1$ there are $N_{T_1}$ nodes and starting a new node, this $N_{T_1}+1$ th node will not be accounted for the password at time $T_1$ but for future passwords only, for example time $T_2$;

said angles theta at time sum of theta angles from M of the whole FNN at time $T_1 =$ $$\frac{1}{N_{T_1}}\sum_{k=0}^{N_{T_1}}(v_{mi}T_1)\%(2\pi r_{1i})$$

and theta angles at time $T_2$:

sum of theta angles from S of the whole FNN at time $T_2 =$ $$\frac{1}{N_{T_2}}\sum_{k=0}^{N_{T_2}}(v_{mi}T_2)\%(2\pi r_{1i})$$

where $N_{T_2} = N_1 + 1$;

And the angular velocities at time $T_1$:

sum of angular velocities from $M$ of the whole FNN at time $T_1$ =

$$\frac{1}{N_{T_1}} \sum_{i=0}^{N_{T_1}} \frac{v_{mi}}{2\pi r_{1i}}$$

and angular velocities at time $T_2$:

sum of angular velocities from $S$ of the whole FNN at time $T_2$ =

$$\frac{1}{N_{T_2}} \sum_{i=0}^{N_{T_2}} \frac{v_{si}}{2\pi r_{2i}}$$

where $N_{T_2} = N_{T_1} + 1$.

\* \* \* \* \*